United States Patent
Asai et al.

(10) Patent No.: US 10,480,379 B2
(45) Date of Patent: Nov. 19, 2019

(54) EXHAUST HEAT RECOVERY DEVICE INCLUDING ENGAGEMENT PORTION CONFIGURED TO ROTATE VALVE

(71) Applicant: FUTABA INDUSTRIAL CO., LTD., Okazaki-shi, Aichi (JP)

(72) Inventors: Ryuji Asai, Okazaki (JP); Arata Kobayashi, Okazaki (JP); Hirohisa Okami, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 242 days.

(21) Appl. No.: 15/533,210

(22) PCT Filed: Sep. 4, 2015

(86) PCT No.: PCT/JP2015/075200
§ 371 (c)(1),
(2) Date: Jun. 5, 2017

(87) PCT Pub. No.: WO2016/088419
PCT Pub. Date: Jun. 9, 2016

(65) Prior Publication Data
US 2017/0328256 A1    Nov. 16, 2017

(30) Foreign Application Priority Data
Dec. 3, 2014   (JP) ................... 2014-244981

(51) Int. Cl.
*F01N 5/02* (2006.01)
*F01N 13/08* (2010.01)

(52) U.S. Cl.
CPC .............. *F01N 5/02* (2013.01); *F01N 5/025* (2013.01); *F01N 13/08* (2013.01);
(Continued)

(58) Field of Classification Search
CPC ........ F01N 13/08; F01N 2240/02; F01N 5/02; F01N 5/025; F01N 2240/20; F01N 2240/36; Y02T 10/16
(Continued)

(56) References Cited

U.S. PATENT DOCUMENTS 6,702,190 B1 *   3/2004  Nohl ................. B60H 1/025
                                                       165/41
2009/0038302 A1 * 2/2009 Yamada ............ F01N 3/0205
                                                        60/320
(Continued)

FOREIGN PATENT DOCUMENTS

CN    103998737 A    8/2014
JP    2008-101481 A  5/2008
(Continued)

OTHER PUBLICATIONS

First Office Action for Chinese Patent Application No. 201580066007.6, dated Sep. 3, 2018, 14 pages.
(Continued)

*Primary Examiner* — Audrey K Bradley
*Assistant Examiner* — Diem T Tran
(74) *Attorney, Agent, or Firm* — Withrow & Terranova, P.L.L.C.; Vincent K. Gustafson

(57) ABSTRACT

An exhaust heat recovery device comprises an exhaust pipe, a shell member, a heat exchange portion, an inflow portion, a valve, a driving portion that generates a driving force for driving the valve, and a transmitting portion that transmits the driving force generated by the driving portion to the valve. The driving portion comprises an expansion portion that expands when an external electrical signal is inputted thereto, and a linearly moving portion that extends according to expansion of the expansion portion.

7 Claims, 5 Drawing Sheets

(52) U.S. Cl.
 CPC ...... *F01N 2240/02* (2013.01); *F01N 2240/20* (2013.01); *Y02T 10/16* (2013.01)

(58) Field of Classification Search
 USPC .......................................... 60/298, 320, 324
 See application file for complete search history.

(56) References Cited

U.S. PATENT DOCUMENTS

| | | | |
|---|---|---|---|
| 2010/0251702 A1* | 10/2010 | Shikazono | F01N 5/02 60/320 |
| 2011/0131961 A1* | 6/2011 | Lee | F01M 5/001 60/320 |
| 2012/0062354 A1 | 3/2012 | Izuka et al. | |
| 2014/0352286 A1 | 12/2014 | Kato et al. | |
| 2015/0218997 A1 | 8/2015 | Kato et al. | |
| 2015/0275739 A1 | 10/2015 | Ishihata et al. | |

FOREIGN PATENT DOCUMENTS

| | | | |
|---|---|---|---|
| JP | 2008101481 | * | 5/2008 |
| JP | 2009-115075 | A | 5/2009 |
| JP | 2010-071454 | A | 4/2010 |
| JP | 2010-276107 | A | 12/2010 |
| JP | 2010276107 | * | 12/2010 |
| JP | 2014-034963 | A | 2/2014 |
| JP | 2015-183639 | A | 10/2015 |

OTHER PUBLICATIONS

Notification of Reasons for Refusal for Japanese Patent Application No. 2014-244981, dated Nov. 13, 2018, 6 pages.
International Search Report for International Patent Application No. PCT/JP2015/075200 (Form PCT/ISA/210), dated Dec. 1, 2015 (5 pages including English translation).
Written Opinion for International Patent Application No. PCT/JP2015/075200 (Form PCT/ISA/237), dated Dec. 1, 2015 (12 pages including English translation).

* cited by examiner

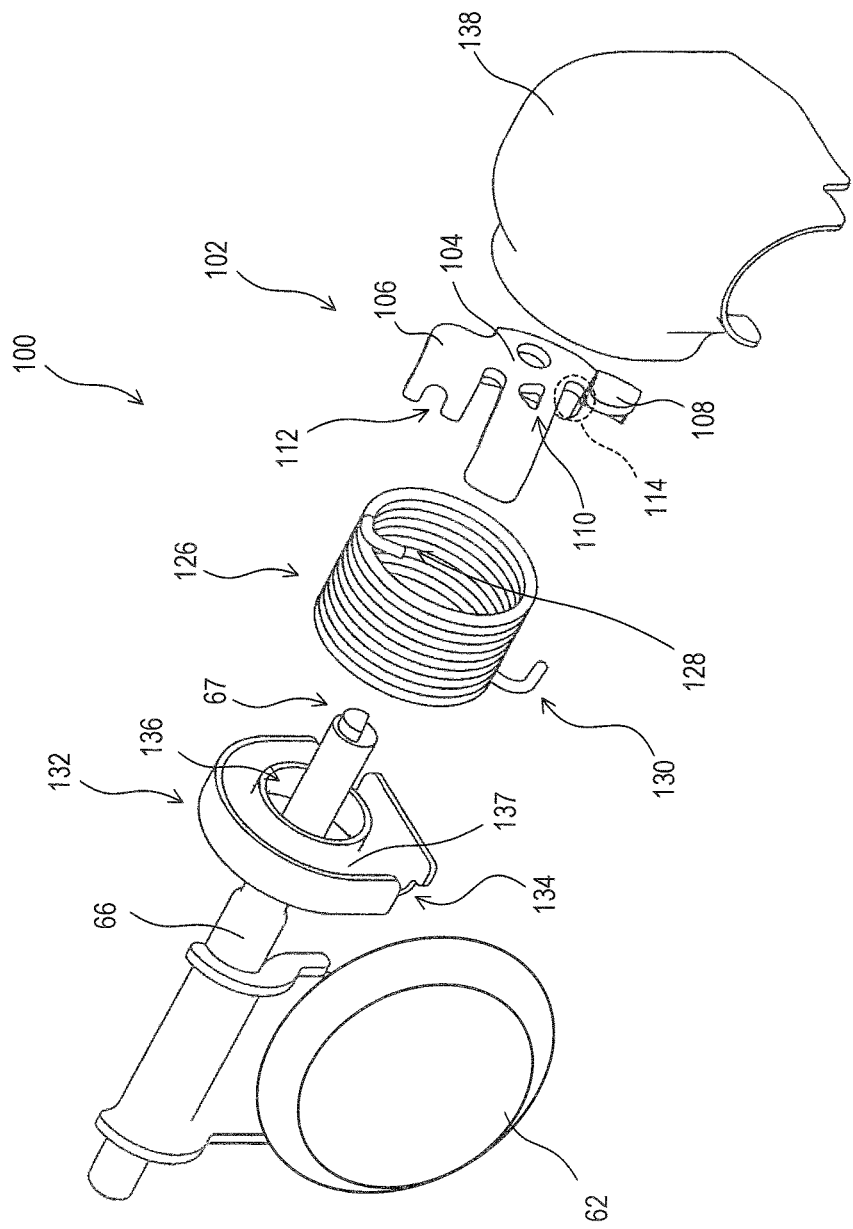

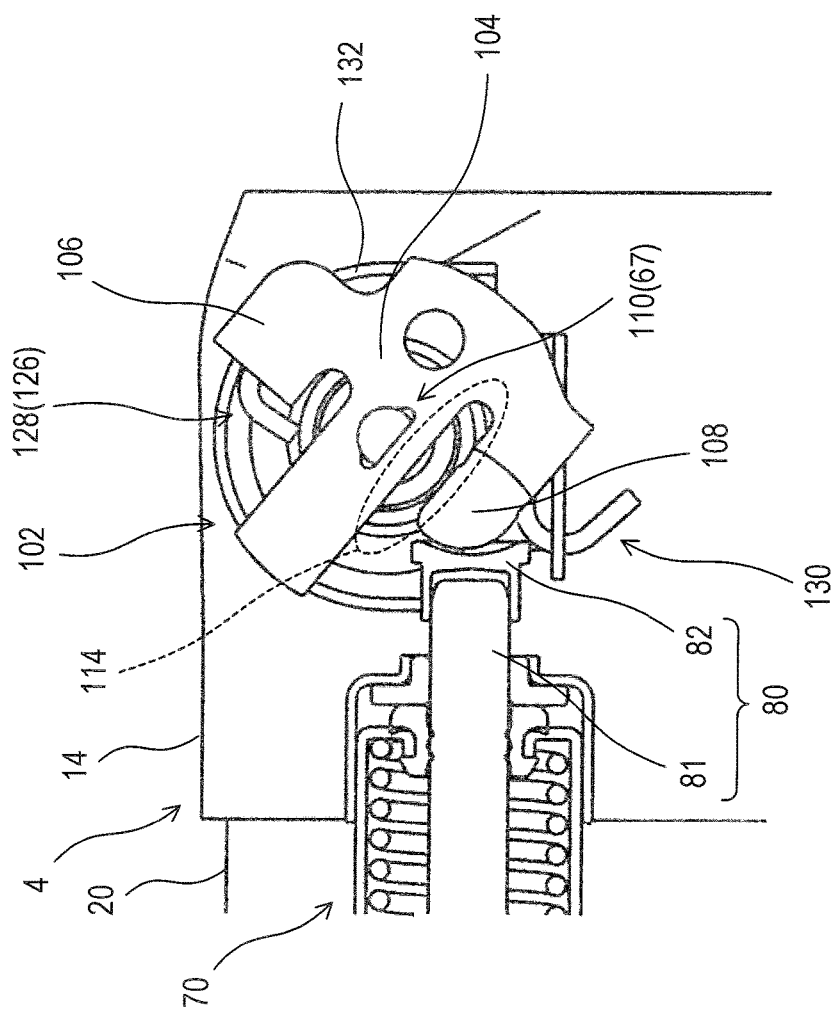

EXHAUST HEAT RECOVERY DEVICE INCLUDING ENGAGEMENT PORTION CONFIGURED TO ROTATE VALVE

CROSS-REFERENCE TO RELATED APPLICATIONS

This application is a 35 U.S.C. § 371 national phase filing of International Application No. PCT/JP2015/075200 filed on Sep. 4, 2015, and claims the benefit of Japanese Patent Application No. 2014-244981 filed on Dec. 3, 2014 with the Japan Patent Office. The entire disclosures of International Application No. PCT/JP2015/075200 and Japanese Patent Application No. 2014-244981 are hereby incorporated by reference herein in their respective entireties.

TECHNICAL FIELD

The present disclosure relates to an exhaust heat recovery device.

BACKGROUND

An exhaust heat recovery device is known that recovers exhaust heat by performing heat exchange between exhaust gas from an internal combustion engine as high-temperature fluid and cooling water of the internal combustion engine as low-temperature fluid (see Patent Document 1).

An exhaust heat recovery device of this kind comprises an exhaust pipe, a shell member, a heat exchange portion, an exhaust gas inflow portion, a valve, and a driving portion. The exhaust pipe allows exhaust gas from an internal combustion engine to be guided downstream. The shell member is a tubular member that covers a radially outer side of the exhaust pipe. The heat exchange portion performs heat exchange between exhaust gas as high-temperature fluid and cooling water of the internal combustion engine as low-temperature fluid. The exhaust gas inflow portion comprises a flow path through which the exhaust gas from the exhaust pipe to the heat exchange portion flows. The valve is arranged downstream of the inflow portion along the flow path of the exhaust gas in the exhaust pipe.

The driving portion generates a driving force required to drive the valve. It is conceivable to use, as such a driving portion, a negative pressure actuator that generates the driving force by means of pressure of the internal combustion engine.

PRIOR ART DOCUMENTS

Patent Documents

Patent Document 1: Japanese Unexamined Patent Application Publication No. 2014-34963

SUMMARY OF THE INVENTION

Problems to be Solved by the Invention

Incidentally, a bore diameter (inside diameter) of the negative pressure actuator needs to be large in order to generate the driving force required to drive the valve. Thus, in the negative pressure actuator, there is a problem of increase in the volume occupied by the actuator, and eventually the volume occupied by the exhaust heat recovery device.

To solve this problem, it is conceivable to use, as the driving portion for the exhaust heat recovery device, a thermo-actuator that is actuated in dependence on water temperature. The thermo-actuator comprises at least a pipe through which coolant of the internal combustion engine flows, a thermo-actuator that is arranged in the path of the pipe and that comprises a wax that expands more as the liquid temperature of the coolant becomes higher, and a piston that extends according to expansion of the wax.

In such a thermo-actuator, it is necessary to cause the coolant of the internal combustion engine to flow within the thermo-actuator, and thus, there is a possibility of leak of the coolant.

In addition, since the piston extends according to the liquid temperature of the coolant, the thermo-actuator has a problem of not being able to drive the valve when the liquid temperature of the coolant does not reach a temperature at which expansion of the wax starts. That is, when the water temperature type thermo-actuator is used as the driving portion for the exhaust heat recovery device, it is difficult to drive the valve at a specified timing.

In other words, in conventional techniques, it might be difficult to enable driving of the valve at a specified timing while inhibiting increase in the volume occupied by the exhaust heat recovery device and while reducing the possibility of leak of the coolant.

One aspect of the present disclosure is directed to providing a technique of enabling driving of the valve at a specified timing while inhibiting increase in the volume occupied by the exhaust heat recovery device and while reducing the possibility of leak of the coolant.

Means for Solving the Problems

One aspect of the present disclosure relates to an exhaust heat recovery device comprising an exhaust pipe, a shell member, a heat exchange portion, an inflow portion, a valve, a driving portion, and a transmitting portion.

The exhaust pipe has a tubular shape and allows exhaust gas from an internal combustion engine to be guided downstream. The shell member covers an outer side of the exhaust pipe. The heat exchange portion is arranged between the exhaust pipe and the shell member, and comprises a heat exchanger that performs heat exchange between the exhaust gas as a high-temperature fluid and a low-temperature fluid flowing within the heat exchanger.

The inflow portion comprises an inflow path through which the exhaust gas flows from the exhaust pipe to the heat exchange portion. The valve is arranged downstream of the inflow portion along a flow path of the exhaust gas in the exhaust pipe, and opens and closes the exhaust pipe. The driving portion generates a driving force for driving the valve. The transmitting portion transmits the driving force generated by the driving portion to the valve.

The driving portion in one aspect of the present disclosure comprises an expansion portion and a linearly moving portion. The expansion portion expands when an external electrical signal is inputted thereto. The linearly moving portion extends according to expansion of the expansion portion.

The driving portion in one aspect of the present disclosure is a so-called electrically controlled thermo-actuator. The volume occupied by a general electrically controlled thermo-actuator is smaller than the volume occupied by a negative pressure actuator and is equivalent to the volume occupied by a water temperature type thermo-actuator. Thus, according to the exhaust heat recovery device in which the electrically controlled thermo-actuator is used as a driving source of the valve, increase in the volume occupied by the exhaust heat recovery device can be inhibited.

Further, in the electrically controlled thermo-actuator, it is not necessary to cause the coolant of the internal combustion engine to flow within the electrically controlled thermo-actuator. Thus, when the electrically controlled thermo-actuator is used as the driving portion for the exhaust heat recovery device, leak of the coolant of the internal combustion engine can be inhibited, which is different from a case in which the water temperature type thermo-actuator is used.

In addition, in the driving portion in one aspect of the present disclosure, extension of the linearly moving portion can be performed at a timing of external input of the electrical signal. Thus, according to the exhaust heat recovery device in one aspect of the present disclosure, the valve can be driven at a specified timing regardless of the liquid temperature of the cooling water.

Consequently, according to the exhaust heat recovery device in one aspect of the present disclosure, driving of the valve at the specified timing is enabled, while inhibiting increase in the volume occupied by the exhaust heat recovery device and while reducing the possibility of leak of the coolant.

The driving portion may comprise a driving portion casing and may be arranged outside of a surface of the shell member. The driving portion casing is a member that covers the expansion portion and at least part of the linearly moving portion. In this case, the exhaust heat recovery device may comprise a case. The case is a case fixed to the shell member so as to cover at least the transmitting portion, and is a member coupled to the driving portion casing.

In the exhaust heat recovery device in one aspect of the present disclosure, fixation of the driving portion is assisted by the case. Thus, according to the exhaust heat recovery device in one aspect of the present disclosure, stiffness of the driving portion arranged outside of the surface of the shell member can be improved. As a result, according to the exhaust heat recovery device in one aspect of the present disclosure, mutual disengagement between the linearly moving portion and the transmitting portion due to excitation such as vibration can be reduced, and problems in opening and closing the valve can be inhibited from occurring.

The transmitting portion may comprise an engagement portion and a spring. The engagement portion is a member that is fixed to a shaft of the valve and that engages with the linearly moving portion. The spring used for the exhaust heat recovery device is configured as a torsion spring in many cases. In one aspect of the present disclosure, at least one end of the torsion spring may be directed inward in a radial direction of the torsion spring.

According to the thus-configured exhaust heat recovery device, increase in a size of the torsion spring from one end thereof to the other end thereof can be inhibited, and thus, increase in a diameter of the torsion spring as a whole can be inhibited. Further, according to the exhaust heat recovery device in one aspect of the present disclosure, increase in the volume occupied by the exhaust heat recovery device can be inhibited.

The engagement portion may comprise an engagement part having an arc-like shape. In this case, the linearly moving portion may comprise a piston. In the piston, a shape of a seating face to be engaged with the engagement part of the engagement portion may be an arc-like concave shape.

According to the exhaust heat recovery device in one aspect of the present disclosure, the seating face of the piston and the engagement part of the engagement portion contact each other, and thus, linear motion of the piston can be converted into rotational motion more reliably by means of the engagement portion. Further, according to the exhaust heat recovery device in one aspect of the present disclosure, it can be inhibited that a range of movement of the piston required to open the valve becomes extremely long, because the engagement part of the engagement portion has the arc-like shape and the seating face of the piston is a concave portion to be engaged with the engagement part.

Consequently, according to the exhaust heat recovery device in one aspect of the present disclosure, the valve can be driven more reliably and smoothly.

The engagement portion may comprise a relief portion at a position adjacent to the engagement part. The relief portion provides a non-contact state of a leading end of the piston.

In the thus-configured exhaust heat recovery device, when the piston and the engagement portion are engaged with each other to cause the engagement portion to turn, a portion in the leading end of the piston, which is not the seating face, is brought into a non-contact state with the relief portion arranged in the engagement portion, while the seating face of the piston and the engagement part are engaged with each other.

Consequently, according to the exhaust heat recovery device in one aspect of the present disclosure, it can be reduced that the engagement portion limits extension and retraction of the piston, to thereby enable smoother extension and retraction of the piston, and eventually smoother driving of the valve.

The expansion portion may comprise a heating element that generates heat by receiving an external electrical signal, a thermally expandable member that expands more as temperature thereof becomes higher, and a thermal insulator that insulates at least part of a surface of the thermally expandable member.

According to the thus-configured exhaust heat recovery device, expansion of the thermally expandable member due to an increase in ambient temperature can be inhibited because at least part of the surface of the thermally expandable member is insulated.

BRIEF DESCRIPTION OF THE DRAWINGS

FIG. 4 is an exploded perspective view showing a partial configuration of a transmitting portion and the valve.

FIG. 5 is an explanatory view showing an engagement relationship between the driving portion and the transmitting portion.

EXPLANATION OF REFERENCE NUMERALS

1 . . . exhaust heat recovery device, 2 . . . exhaust portion, 4 . . . shell member, 6 . . . heat exchange portion, 8 . . . inflow portion, 10 . . . valve, 12, 14 . . . exhaust pipe, 16 . . . upstream end, 18 . . . exhaust downstream end, 20 . . . outer covering member, 22 . . . lid member, 24 . . . holding member, 26 . . . flange, 28 . . . heat exchange chamber, 30 . . . heat exchanger, 32 . . . plate, 44 . . . inflow pipe, 46 . . . outflow pipe, 50, 52, 54 . . . interspace, 56 . . . guide member, 58 . . . leading end portion, 60 . . . straight pipe portion, 62 . . . valve body, 64 . . . valve seat, 66 . . . valve shaft, 67 . . . end portion, 68 . . . mesh member, 70 . . . driving portion, 72 . . . expansion portion, 74 . . . heating element, 76 . . . thermally expandable member, 78 . . . linearly moving portion, 80 . . . piston, 81 . . . piston body, 82 . . . seating face portion, 83 . . . holding portion, 84 . . . plate-like portion, 85 . . . concave portion, 86 . . . spring, 88 . . . driving portion casing, 90, 92 . . . first and second driving portion cases, 94 . . . fixing portion, 96 . . . thermal insulator, 100 . . . transmitting portion, 102 . . . engagement portion, 104 . . . main body part, 106 . . . holding part, 108 . . . engagement part, 110 . . . locking hole, 112 . . . cut-out, 114 . . . interspace, 126 . . . torsion spring, 128 . . . first end, 130 . . . second end, 132 . . . spring holder, 134 . . . cut-out, 136 . . . insertion hole, 137 . . . annular accommodating portion, 138 . . . case, 140 . . . internal combustion engine

MODE FOR CARRYING OUT THE INVENTION

Figure 1:
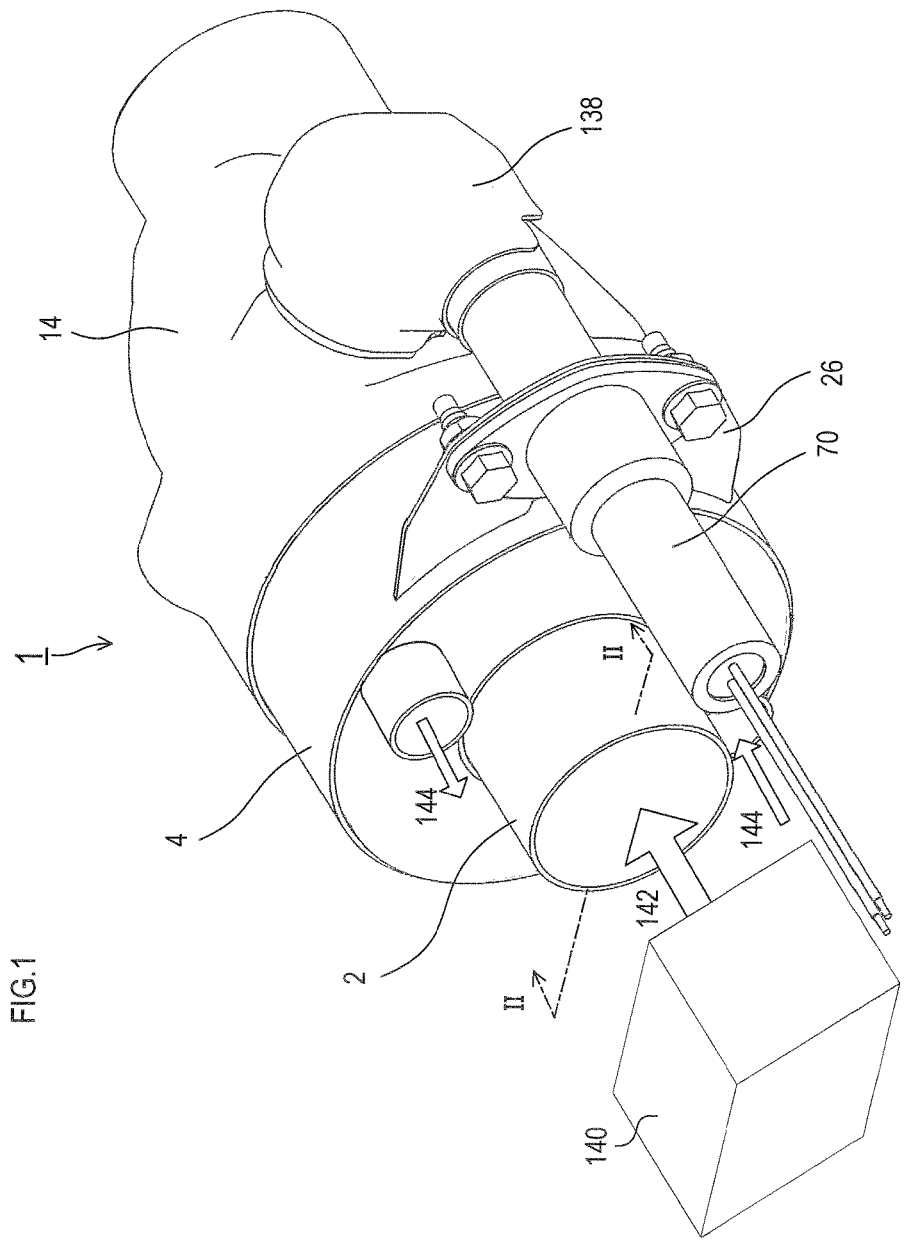
FIG. 1 is a perspective view showing an external appearance of an exhaust heat recovery device according to an embodiment.

An embodiment as one example of the present disclosure will be described below with reference to the drawings.
<Exhaust Heat Recovery Device>
An exhaust heat recovery device 1 shown in FIG. 1 is mounted on a moving vehicle comprising an internal combustion engine 140. The exhaust heat recovery device 1 recovers heat from exhaust gas 142 by performing heat exchange between the exhaust gas 142 from the internal combustion engine 140 as a high-temperature fluid and a coolant 144 for the internal combustion engine 140 as a low-temperature fluid. The coolant 144 in the present embodiment may be cooling water or oil.

The exhaust heat recovery device 1 of the present embodiment comprises an exhaust portion 2, a shell member 4, a heat exchange portion 6 (see FIG. 2), an inflow portion 8 (see FIG. 2), a valve 10 (see FIG. 2), a driving portion 70, and a transmitting portion 100 (see FIG. 4).

The exhaust portion 2 forms a path that allows the exhaust gas 142 from the internal combustion engine 140 to be guided downstream. The shell member 4 is a member that covers an outer side of the exhaust portion 2. The heat exchange portion 6 comprises a heat exchanger 30 (see FIG. 2) arranged between the exhaust portion 2 and the shell member 4, and performs heat exchange between the exhaust gas 142 as the high-temperature fluid and the low-temperature fluid.

The inflow portion 8 is a portion where the exhaust gas 142 flows from the exhaust portion 2 into the heat exchange portion 6. The valve 10 is a valve that opens and closes a flow path of the exhaust gas 142, and is arranged downstream of the inflow portion 8 along the flow path of the exhaust gas 142 in the exhaust portion 2. The driving portion 70 generates a driving force that drives the valve 10. The transmitting portion 100 transmits the driving force generated by the driving portion 70 to the valve 10.

Figure 2:
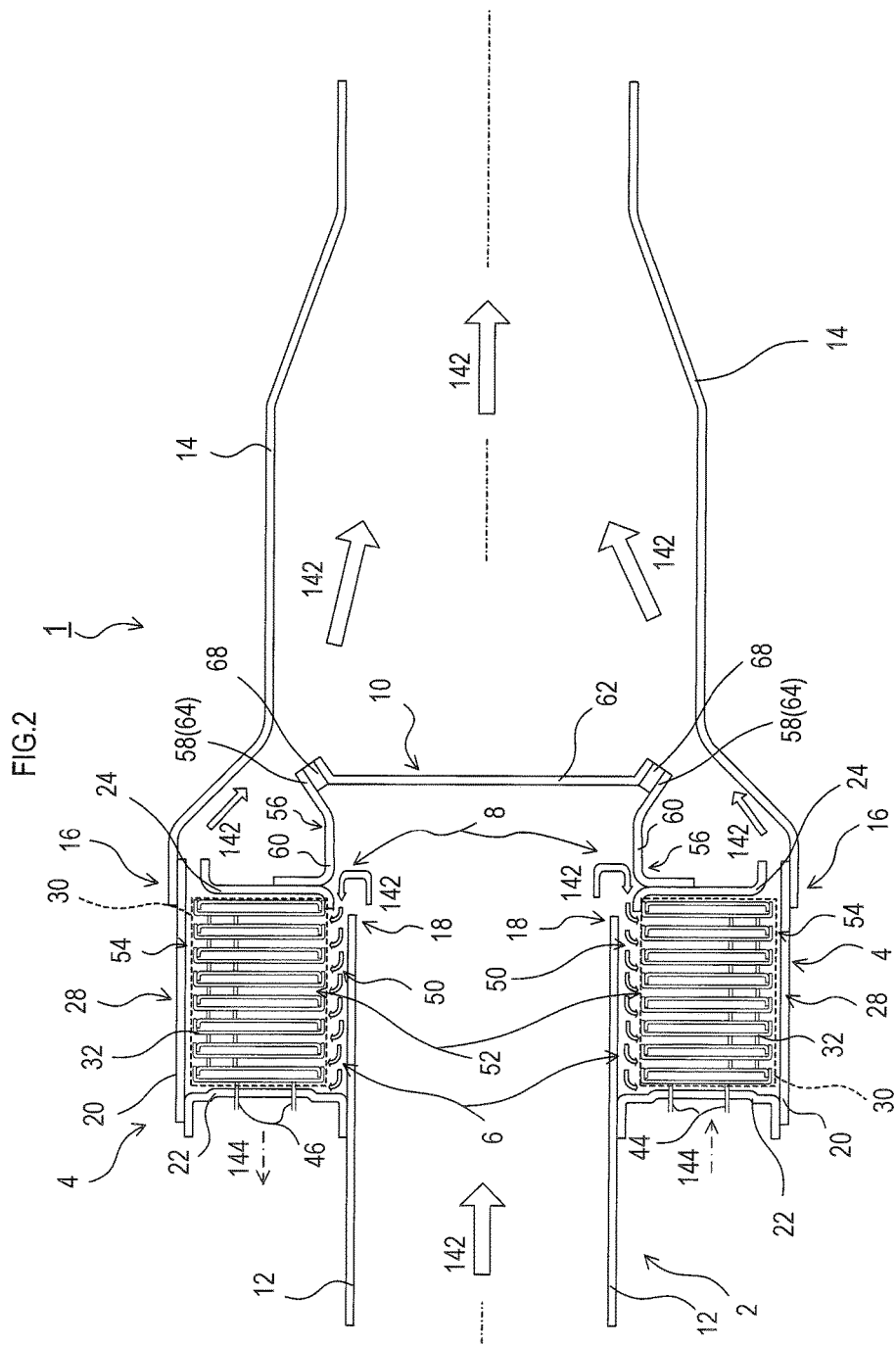
FIG. 2 is a sectional view of the exhaust heat recovery device with a valve closed taken along line II-II in FIG. 1.

<Structure of Exhaust Heat Recovery Device>
As shown in FIG. 2, the exhaust portion 2 comprises an exhaust pipe 12. The exhaust pipe 12 has a cylindrical shape with both ends thereof opened. The exhaust pipe 12 is coupled to an exhaust pipe, an exhaust manifold, or the like, into which the exhaust gas 142 from the internal combustion engine 140 flows.

The shell member 4 comprises an exhaust pipe 14, an outer covering member 20, a lid member 22, and a holding member 24.

The exhaust pipe 14 has a cylindrical shape with both ends thereof opened.

Both ends of the outer covering member 20 are opened. The outer covering member 20 has a cylindrical shape having an inside diameter larger than a diameter of the exhaust pipe 12. A downstream end of the outer covering member 20 is coupled to an upstream end 16 of the exhaust pipe 14. Provided on an outer surface of the outer covering member 20 is a flange 26 (see FIG. 1).

The lid member 22 closes an upstream opening of the outer covering member 20. The upstream opening is an opening positioned on an upstream side along the flow path of the exhaust gas 142 in the exhaust pipe 12.

That is, the outer covering member 20, the lid member 22, and the exhaust pipe 12 form a heat exchange chamber 28, which is an annular space surrounded by the outer covering member 20, the lid member 22, and the exhaust pipe 12.

The heat exchanger 30 arranged in the heat exchange chamber 28 is a so-called plate stacked type heat exchanger comprising a plurality of plates 32. Each plate 32 is a member within which the coolant 144 flows. The plates 32 in the present embodiment are stacked with each other such that an interspace 52 is formed between outer surfaces of the plates 32 mutually adjacent in an axial direction of the exhaust pipe 12.

The heat exchanger 30 is arranged such that an interspace 50 is formed between a radially inner periphery of each plate 32 and an outer surface of the exhaust pipe 12 and such that an interspace 54 is formed between a radially outer periphery of each plate 32 and an inner surface of the outer covering member 20.

The coolant 144 from outside of the heat exchanger 30 flows into one of the plates 32 via an inflow pipe 44. The coolant 144 that has flown within the plates 32 flows out of the heat exchanger 30 via an outflow pipe 46.

In the present embodiment, heat exchange is performed between the exhaust gas 142 flowing through the interspace 50, the interspace 52, and the interspace 54 as the high-temperature fluid and the coolant 144 flowing within the respective plates 32 as the low-temperature fluid. That is, the heat exchange chamber 28, in which the heat exchanger 30 is arranged, functions as the heat exchange portion 6.

The holding member 24 holds the heat exchanger 30 arranged in the heat exchange chamber 28.

The inflow portion 8 comprises a guide member 56.

The guide member 56 is a cylindrical member having an inside diameter larger than an outside diameter of the exhaust pipe 12, and both ends of the guide member 56 are opened. The guide member 56 comprises a leading end portion 58 and a straight pipe portion 60.

The straight pipe portion 60 is a cylindrical portion having an inside diameter larger than the outside diameter of the exhaust pipe 12, and both ends of the straight pipe portion 60 are opened. The straight pipe portion 60 is positioned downstream of an exhaust downstream end 18 along the flow path of the exhaust gas 142 in the exhaust portion 2. The exhaust downstream end 18 mentioned here is a downstream end of the exhaust pipe 12 along the flow path of the exhaust gas 142.

An upstream end of the straight pipe portion 60 is coupled to the holding member 24. On the other hand, a downstream end of the straight pipe portion 60, i.e., an inflow end, is coupled to the leading end portion 58. The leading end portion 58 is a portion having a diffuser-like shape, in which a diameter thereof becomes larger toward an end opposite the inflow end.

With such a structure, an opening is formed circumferentially between the exhaust downstream end 18 of the exhaust pipe 12 and the guide member 56. The opening between the exhaust downstream end 18 of the exhaust pipe 12 and the guide member 56 functions as an inlet of the exhaust gas 142 into the heat exchange portion 6.

The valve 10 comprises at least a valve body 62, a valve seat 64, and a valve shaft 66 (see FIG. 4).

The valve body 62 is a disk-like-shaped member having a diameter larger than an inside diameter of the straight pipe portion 60 of the guide member 56 (and thus than the diameter of the exhaust pipe 12).

The valve shaft 66 is a shaft coupled to the valve body 62 to drive the valve body 62.

The valve seat 64 is a member to close the exhaust portion 2 (the guide member 56) by contact with the valve body 62. The valve seat 64 in the present embodiment is the leading end portion 58 of the guide member 56. Attached on an inner peripheral surface of the valve seat 64 is a mesh member 68 having a mesh shape.

<Structure of Driving Portion>

Figure 3:
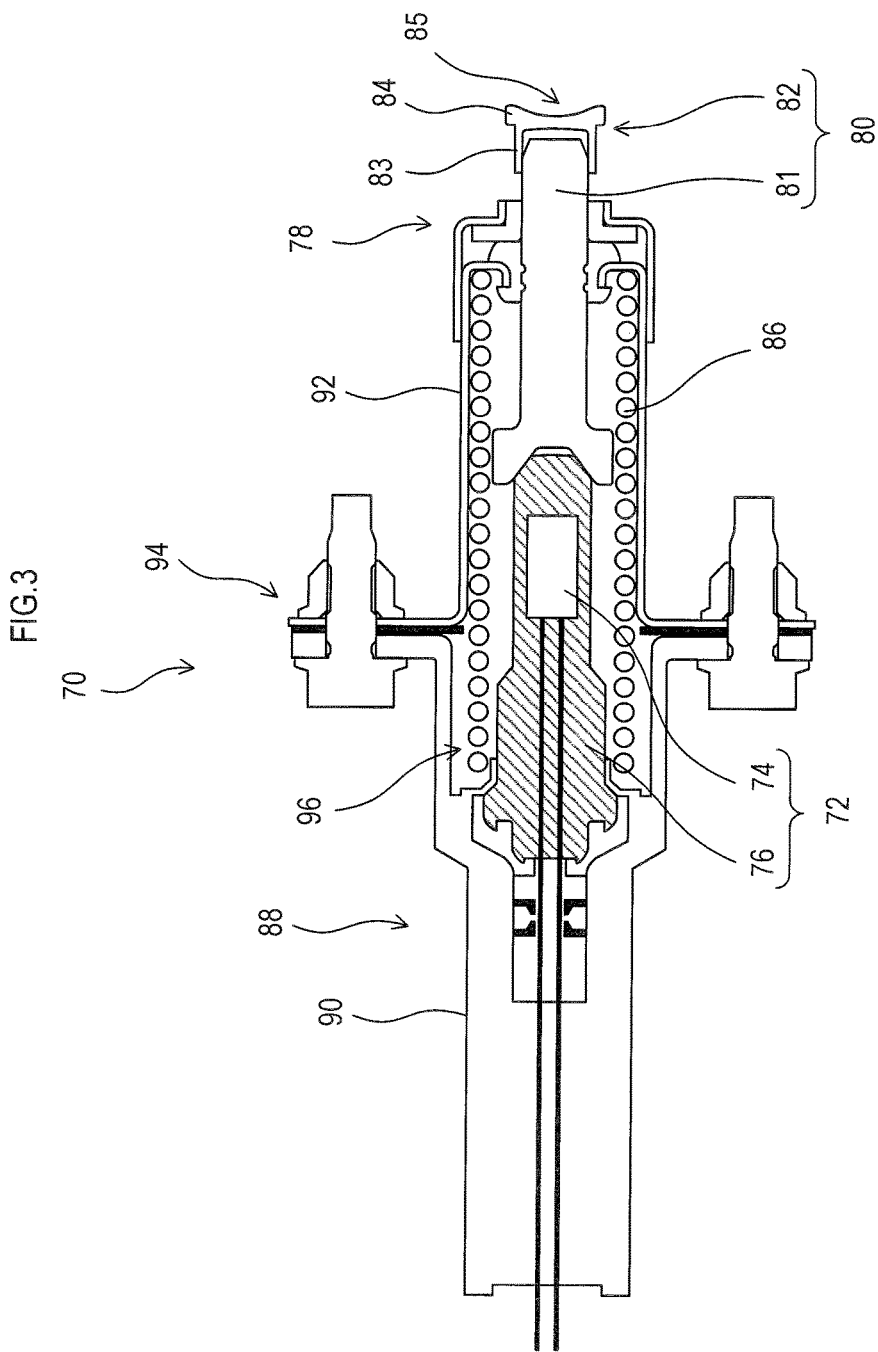
FIG. 3 is a sectional view showing a schematic configuration of a driving portion.

As shown in FIG. 3, the driving portion 70 comprises an expansion portion 72, a linearly moving portion 78, and a driving portion casing 88.

The expansion portion 72 comprises a heating element 74 and a thermally expandable member 76. The heating element 74 generates heat when an external electrical signal is applied thereto. The higher the temperature of the thermally expandable member 76 is, the more it expands. That is, the expansion portion 72 expands when the electrical signal is inputted from an external unit. The external unit mentioned here may include, for example, an electronic control unit (ECU) and a microcomputer mounted on a moving vehicle. One example of the thermally expandable member is a wax.

The linearly moving portion 78 comprises a piston 80 and a spring 86.

The piston 80 comprises a piston body 81 and a seating face portion 82. The piston body 81 is a member having a rod-like or pipe-like shape.

The seating face portion 82 is a member fixed to a leading end of the piston body 81, and comprises a holding portion 83 and a plate-like portion 84. The holding portion 83 holds the leading end of the piston body 81. The plate-like portion 84 is a disk-like-shaped portion having a diameter larger than that of the piston body 81, and is coaxially fixed to one end of the holding portion 83. Further, the plate-like portion 84 comprises a concave portion 85 of an arc-like shape formed on a surface thereof opposite a surface coupled to the holding portion 83.

The spring 86 is a well-known coil spring. The spring 86 is arranged within the driving portion casing 88 so as to apply, to the piston 80, a biasing force directed to a direction in which a leading end of the piston 80 positioned in an extended position moves toward a non-extended position. The extended position mentioned here is a position where a piston is present when being extended. The non-extended position mentioned here is a position where a piston is present when being retracted.

The driving portion casing 88 is a tubular member that contains therein the expansion portion 72 and the linearly moving portion 78. The driving portion casing 88 comprises a first driving portion case 90 and a second driving portion case 92. The driving portion casing 88 comprises a fixing portion 94 formed to engage with the flange 26 on the shell member 4.

The fixing portion 94 is fixed to the flange 26 to thereby allow the driving portion 70 to be assembled to an outer surface of the shell member 4. Fixation of the fixing portion 94 to the flange 26 may be performed by using a fastening member such as a screw, a bolt, or a rivet, or may be performed by other method such as welding or brazing.

The driving portion casing 88 comprises a thermal insulator 96, by which at least part of a surface of the thermally expandable member 76 is insulated. Air is filled between the thermally expandable member 76 and the driving portion casing 88 to constitute the thermal insulator 96 of the present embodiment. That is, in the thermal insulator 96 of the present embodiment, air provides an improved insulation effect.

However, the thermal insulator 96 is not limited to this, and may be constituted by, for example, a fibrous insulation material, a foam insulation material, a vacuum insulation material, or the like that covers at least part of the surface of the thermally expandable member 76. In the case of using such fibrous insulation material, foam insulation material, and vacuum insulation material, the thermal insulator 96 may cover an outer surface of the driving portion casing 88.

In the driving portion 70, the heating element 74 generates heat in accordance with the electrical signal inputted externally. Such heat generated by the heating element 74 expands the thermally expandable member 76 to cause the piston 80 to move in a straight line from the non-extended position to the extended position. When the externally inputted electrical signal is stopped, heat generation by the heating element 74 is stopped. When the heating element 74 stops generating heat and is cooled down, the thermally expandable member 76 contracts. In this case, the piston 80 is retracted to the non-extended position by the biasing force of the spring 86.

As described above, the driving portion 70 in the present embodiment is a so-called electrically controlled thermo-actuator.

<Structure of Transmitting Portion>

The transmitting portion 100 is a cam mechanism that converts linear motion of the driving portion 70 into rotational motion. As shown in FIG. 4, the transmitting portion 100 comprises an engagement portion 102, a torsion spring 126, a spring holder 132, and a case 138.

The torsion spring 126 is a so-called torsion coil spring. One end of the torsion spring 126, i.e., a first end 128, is directed inward in a radial direction. An end of the torsion spring 126 opposite the first end 128, i.e., a second end 130, is directed outward in the radial direction.

The spring holder 132 comprises an insertion hole 136 formed for insertion of the valve shaft 66, and an annular accommodating portion 137 formed so as to surround the insertion hole 136. An axial one end of the torsion spring 126 is accommodated in the annular accommodating portion 137. The annular accommodating portion 137 comprises an inner wall that restricts movement of the torsion spring 126 from inside of the torsion spring 126, and an outer wall that restricts movement of the torsion spring 126 from outside of the torsion spring 126. Arranged in the outer wall is a cut-out 134 that holds the second end 130 of the torsion spring 126.

The engagement portion 102 is a lever member fixed to the valve shaft 66 and engaged with the seating face portion 82 of the linearly moving portion 78. The engagement portion 102 comprises a main body part 104, a holding part 106, and an engagement part 108.

The main body part 104 is a plate-like part, and contains a locking hole 110 formed in a drilled manner, into which an end portion 67 of the valve shaft 66 is locked. The holding part 106 is a part having an L-like plate shape extending from the main body part 104. The holding part 106 comprises a cut-out 112 arranged in a position where the first end 128 of the torsion spring 126 engages therewith.

The engagement part 108 is a plate-like part extending from the main body part 104. A part that is along an outer periphery of the engagement part 108 and that engages with the concave portion 85 formed on the plate-like portion 84 of the seating face portion 82 has an arc-like shape. The engagement part 108 is coupled to the main body part 104 so as to have an interspace 114 between the main body part 104 and the engagement part 108.

Next, arrangement of the transmitting portion 100 will be described.

As shown in FIG. 5, the engagement portion 102, the torsion spring 126, and the spring holder 132 are arranged outside the shell member 4.

As for the torsion spring 126 among them, the axial one end is accommodated in the annular accommodating portion 137 of the spring holder 132, and the second end 130 is locked into the cut-out 134 of the spring holder 132.

The first end 128 of the torsion spring 126 is locked into the cut-out 112 in the holding part 106 of the engagement portion 102. In the present embodiment, the torsion spring 126 is assembled so as to apply a biasing force in a direction to close the valve body 62.

Further, the engagement portion 102 is arranged such that the end portion 67 of the valve shaft 66 is locked into the locking hole 110.

In the present embodiment, when the piston 80 extends, the seating face portion 82 of the piston 80 presses the engagement part 108 of the engagement portion 102. The engagement portion 102 pressed by the piston 80 turns, and the valve shaft 66 to which the engagement portion 102 is fixed also turns.

In a valve-opened state, the main body part 104 of the engagement portion 102 and an upper end of the seating face portion 82 are brought into a mutually non-contact state by the interspace 114 arranged between the engagement part 108 and the main body part 104. That is, the interspace 114 serves as one example of a relief portion recited in the claims.

When the piston 80 is retracted, the biasing force of the torsion spring 126 provides a valve-closed state.

Next, the case 138 is an L-like-shaped member having an internal space covering the engagement portion 102, and thus the transmitting portion 100, from outside of the shell member 4. The case 138 is fixed so as to be coupled to the shell member 4 and the driving portion casing 88. Fixation of the case 138 to the shell member 4 and the driving portion casing 88 may be performed by welding, may be performed by brazing, or may be performed by other method.

<Effects of Exhaust Heat Recovery Device>

The driving portion 70 of the present embodiment is a so-called electrically controlled thermo-actuator. A volume occupied by a general electrically controlled thermo-actuator is smaller than a volume occupied by a negative pressure actuator and is equivalent to a volume occupied by a water temperature type thermo-actuator. Thus, with the exhaust heat recovery device 1, in which the electrically controlled thermo-actuator is used as a driving source of the valve 10, increase in a volume occupied by the exhaust heat recovery device 1 can be inhibited.

Further, it is not necessary to cause the coolant 144 of the internal combustion engine 140 to flow within the driving portion 70. Thus, with the exhaust heat recovery device 1, leak of the coolant 144 of the internal combustion engine 140 can be inhibited, which is different from a case in which the water temperature type thermo-actuator is used.

In addition, in the driving portion 70, extension of the piston 80 can be performed at a timing of external input of the electrical signal. Thus, with the exhaust heat recovery device 1, valve driving can be performed at a specified timing regardless of a liquid temperature of the coolant 144.

Accordingly, with the exhaust heat recovery device 1, driving of the valve 10 at the specified timing is enabled, while inhibiting increase in the volume occupied by the exhaust heat recovery device and while reducing the possibility of leak of the coolant 144.

Notably, part of the outer periphery of the engagement part 108 of the engagement portion 102 of the present embodiment has the arc-like shape. In addition, the seating face portion 82 of the linearly moving portion 78, which is engaged with the engagement part 108, comprises the concave portion 85 of an arc-like shape so as to be engaged with the engagement part 108.

That is, with the exhaust heat recovery device 1, the engagement part 108 of the engagement portion 102 and the seating face portion 82 contact each other, and thus, linear motion of the piston 80 can be converted into rotational motion of the engagement portion 102 more reliably. Further, with the exhaust heat recovery device 1, it can be inhibited that a range of movement of the piston 80 required to cause a valve-opened state becomes extremely long because the part of the outer periphery of the engagement part 108 has the arc-like shape.

Accordingly, with the exhaust heat recovery device 1, the valve 10 can be driven more reliably and smoothly.

In the exhaust heat recovery device 1, when the linearly moving portion 78 and the engagement portion 102 are engaged with each other to cause the engagement portion 102 to turn, the upper end of the plate-like portion 84 of the seating face portion 82, which is not a portion having the concave portion 85, is brought into a non-contact state with the interspace 114 arranged in the engagement portion 102, while the seating face portion 82 and the engagement part 108 are engaged with each other.

Accordingly, with the exhaust heat recovery device 1, it can be reduced that the engagement portion 102 limits extension and retraction of the piston 80, to thereby enable smoother extension and retraction of the piston 80, and thus smoother driving of the valve 10.

In the exhaust heat recovery device 1, fixation of the driving portion 70 is assisted by the case 138. Thus, with the exhaust heat recovery device 1, stiffness of the driving portion 70 arranged outside of the surface of the shell member 4 can be improved. Accordingly, with the exhaust heat recovery device 1, mutual disengagement between the linearly moving portion 78 and the transmitting portion 100 due to excitation such as vibration can be reduced, and problems in opening and closing the valve 10 can be inhibited.

In the present embodiment, the first end 128 of the torsion spring 126 is directed inward in the radial direction. Thus, it is possible to inhibit increase in a size of the torsion spring 126 from the first end 128 to the second end 130, and thus in a diameter of the torsion spring 126 as a whole. Accordingly, increase in the volume occupied by the exhaust heat recovery device 1 can be inhibited.

In the exhaust heat recovery device 1, at least part of the surface of the thermally expandable member 76 is insulated. Accordingly, with the exhaust heat recovery device 1, expansion of the thermally expandable member 76 due to increase in ambient temperature can be inhibited, and thus, unnecessary valve-opened state can be inhibited from being caused.

Other Embodiments

The embodiment of the present disclosure has been described so far; however, the present disclosure is not limited to the above-described embodiment. The present disclosure can be implemented in various modes within the scope not departing from the gist of the present disclosure.

For example, although the exhaust heat recovery device 1 in the above-described embodiment is mounted on the moving vehicle comprising the internal combustion engine 140, the exhaust heat recovery device of the present disclosure needs not be mounted on the moving vehicle. Specifically, the exhaust heat recovery device of the present disclosure may be used without being mounted on the moving vehicle as long as the exhaust heat recovery device recovers heat of the exhaust gas 142 from the internal combustion engine 140 by performing heat exchange using the exhaust gas 142 as the high-temperature fluid. Further, the low-temperature fluid in the exhaust heat recovery device needs not be the coolant 144 but may be other fluid that acts as the low-temperature fluid.

The heat exchanger of the present disclosure may be any heat exchanger as long as it performs heat exchange between the exhaust gas 142 as the high-temperature fluid and the low-temperature fluid that flows within the heat exchanger.

In the torsion spring 126 of the above-described embodiment, only the first end 128 is directed inward in the radial direction; however, in the torsion spring 126 of the present disclosure, the second end 130, as well as the first end 128, may also be directed inward in the radial direction.

Modes in which part of the structure of the above-described embodiment is omitted are also embodiments of the present disclosure. Moreover, modes constituted by appropriate combinations of the above-described embodiment and modified embodiments are also embodiments of the present disclosure. Furthermore, any modes conceivable within the scope not departing from the essence of the disclosure specified by the language recited in the claims are also embodiments of the present disclosure.

The invention claimed is:

1. An exhaust heat recovery device comprising:
   an exhaust pipe that has a tubular shape and that allows an exhaust gas from an internal combustion engine to be guided downstream;
   a shell member of a tubular shape that covers an outer side of the exhaust pipe;
   a heat exchange portion arranged between the exhaust pipe and the shell member, the heat exchange portion comprising a heat exchanger that performs heat exchange between (i) the exhaust gas as a high-temperature fluid and (ii) a low-temperature fluid flowing within the heat exchanger;
   an inflow portion comprising an inflow path through which the exhaust gas from the exhaust pipe flows to the heat exchange portion;
   a valve arranged downstream of the inflow portion along a flow path of the exhaust gas in the exhaust pipe, the valve opening and closing the exhaust pipe;
   a driving portion that generates a driving force for driving the valve; and
   a transmitting portion that transmits the driving force generated by the driving portion to the valve,
   wherein the driving portion comprises:
      an expansion portion that expands when an external electrical signal is inputted to the driving portion; and
      a linearly moving portion that extends according to expansion of the expansion portion,
   wherein the transmitting portion comprises:
      an engagement portion that is fixed to a shaft of the valve and that engages with the linearly moving portion; and
      a torsion spring that applies a biasing force to the valve, and
   wherein at least one end of the torsion spring is directed inward in a radial direction thereof,
   wherein the engagement portion comprises an engagement part having an arc-like shape,
   wherein the linearly moving portion comprises a piston, and
   wherein, in the piston, a seating face configured to engage the engagement part of the engagement portion comprises an arc-like concave shape.

2. The exhaust heat recovery device according to claim 1, wherein the driving portion comprises a driving portion casing that covers the expansion portion and at least part of the linearly moving portion, the driving portion being arranged outside of a surface of the shell member, and
   wherein the exhaust heat recovery device comprises a case that is fixed to the shell member so as to cover at least the transmitting portion and that is coupled to the driving portion casing.

3. The exhaust heat recovery device according to claim 1, wherein the engagement portion comprises a relief portion at a position adjacent to the engagement part, the relief portion providing a non-contact state of a leading end of the piston.

4. The exhaust heat recovery device according to claim 1, wherein the expansion portion comprises:
   a heating element that generates heat by receiving an external electrical signal;
   a thermally expandable member that expands more as a temperature of the thermally expandable member increases; and
   a thermal insulator that insulates at least part of a surface of the thermally expandable member.

5. The exhaust heat recovery device according to claim 1, wherein the low-temperature fluid comprises coolant of the internal combustion engine.

6. The exhaust heat recovery device according to claim 1, wherein the low-temperature fluid comprises a liquid.

7. The exhaust heat recovery device according to claim 6, wherein the liquid comprises water or oil.

* * * * *